United States Patent [19]
Graham

[11] Patent Number: 5,841,824
[45] Date of Patent: Nov. 24, 1998

[54] SYSTEM AND METHOD FOR TESTING THE FREE FALL TIME OF NUCLEAR REACTOR CONTROL RODS

[75] Inventor: Kinglsey F. Graham, Murrysville, Pa.

[73] Assignee: Westinghouse Electric Corporation, Pittsburgh, Pa.

[21] Appl. No.: 855,274

[22] Filed: May 13, 1997

[51] Int. Cl.⁶ .................................................. G21C 17/12
[52] U.S. Cl. ............................................................ 376/258
[58] Field of Search ................................... 376/258, 259, 376/240

[56] References Cited

U.S. PATENT DOCUMENTS

| | | | |
|---|---|---|---|
| 3,158,766 | 11/1964 | Frisch | 376/228 |
| 3,846,771 | 11/1974 | Young et al. | 376/258 |
| 3,858,191 | 12/1974 | Neuner et al. | 376/258 |
| 3,893,090 | 7/1975 | Neuner et al. | 376/258 |
| 3,992,255 | 11/1976 | DeWesse | 376/228 |
| 5,006,301 | 4/1991 | Lexa | 376/258 |
| 5,408,508 | 4/1995 | Federico et al. | 376/258 |

*Primary Examiner*—Daniel D. Wasil

[57] ABSTRACT

An improved system and method for testing the free fall time of nuclear reactor control rods. The system employs a plurality of sensor coils which are arranged in tandem along the control rod drive rod housing, having a plurality of the sensors energized by a single transformer. During the rod drop test, the transformers' primary windings are shorted.

8 Claims, 6 Drawing Sheets

SYSTEM AND METHOD FOR TESTING THE FREE FALL TIME OF NUCLEAR REACTOR CONTROL RODS

BACKGROUND OF THE INVENTION

1. Field of the Invention

This invention relates generally to nuclear reactor control rod position indication systems and, more particularly, two such systems that can monitor the free fall time of reactor control rods.

2. Background Information

In a nuclear reactor it is important to know the degree of insertion of the control rods within the reactor core. The power output of the reactor core is a direct function of the degree of insertion of the control rods. The use of the term "control rod" is used herein to include any member positioned within the reactor which alters the reactivity of the reactor. Thus, this includes rods which serve other purposes besides normal control use. The use of the words "rod," "element," and "control element" is synonymous with "control rod" for the purposes of this invention.

When fully inserted in the core, the control rods are located within proximity of nuclear fuel elements comprising nuclear fissions material, generally, the greater the number of neutrons within the core of the reactor, the greater the number of fissions of the fuel atoms that is taking place and, consequentially, the greater amount of energy released. Energy, in the form of heat, is removed from the reactive region by a coolant which flows through the region and then flows to a heat exchanger where the heat from the reactor coolant is used to generate steam for driving turbines to transform heat energy into electrical energy. To decrease the energy output of the nuclear reactor, the control rods, made of materials which absorb neutrons, are inserted within the reactive region, commonly known as the nuclear core. The greater the number of control rods and the further the control rods are inserted within the reactive region, the greater the number of neutrons that will be absorbed and, hence, the energy output of the reactor will be decreased. Conversely, to increase the energy output of the reactor, the nuclear control rods are withdrawn from the reactive region. Consequently, the number of neutrons absorbed decreases, the number of fissions increase, and the energy output of the reactor increases. For pressurized water reactors it is of the utmost importance to know the accurate position of each of the control rods. Differences of over fifteen inches between neighboring rods adversely affect fuel management. In addition, knowledge of the position of the rods versus thermal power output gives an indication of the condition of the reactor, thus, the degree of fuel burn up. Therefore, extremely reliable control rod drive and position monitoring systems must be employed in order to maintain the safe and reliable operating status of the reactor. One of the more commonly used types of control rod drive mechanisms is referred to as a "magnetic jack." With this type of mechanism, the control rods are jacked into and from the nuclear core in a series of motions each involving moving the control rod a discrete, incremental distance or "step;" hence, such movement is commonly referred to as "stepping of the control rods." There are typically 231 steps between the fully withdrawn position and the fully inserted position of the control rods. For example, 0 steps indicate the fully inserted position, and 231 steps indicate the fully withdrawn position. This type of mechanism is illustrated and described in U.S. Pat Nos. 3,158,766 to Frisch and 3,992,255 to Dewesse which are assigned to the assignee of the present invention.

This magnetic jack type of control rod drive mechanism includes three electrical magnetic coils and armatures or plungers which are operated to raise and lower a drive rod shaft, which is fixedly connected to a plurality of control rods commonly known as a "cluster," and thereby control the movement of the control rod cluster assembly. The three coils are mounted about and outside of a pressure housing that extends up above the reactor vessel and hermetically seals the path of movement of the drive rods. Two of the coils actuate respective plunges of moveable and stationary grippers contained within the housing. The third coil actuates a lift plunger connected to the moveable gripper. Actuation of the moveable and stationary plungers, in turn, operate sets of circumferentially spaced latches which grip the drive rod shaft having multiple axial spaced circumferential grooves. The stationary gripper latches are actuated to hold the drive shaft in a desired axial position. The moveable gripper latches are actuated to raise and lower the drive rod shaft. Each jacking or stepping movement of the control rod drive mechanism moves the drive rod shaft ⅝ of an inch (1.58 centimeters). The jacking or stepping movement is thus accomplished by the operation of the three sets of axially spaced electromagnetic coils to actuate the corresponding stationary, moveable and lift plungers, so as to alternatively and sequentially grip move and release the control rod drive shaft of the respective mechanism. In a pressurized water reactor, three mechanisms are generally available for providing an indication of the control rod position; a step counter, a moveable in-core flux mapping system, and a rod position indication system.

The step counter provides an indirect measurement by electrically counting the number of mechanical steps commanded by the rod control system. As an indirect measurement system, it cannot detect mechanical malfunctions that prevent rod movement when commanded.

The moveable in-core flux mapping system does provide direct measurement of control rod position as it is moved in a thimble close to the rod of interest. However, it is used for this purpose only as a back up system because of the mechanical wear and operator interaction problems associated with its continual use. Therefore, the rod position indication system is the primary means of direct measurement of control rod position.

As previously described, the control rods move within a pressure vessel and are attached to drive rods, which can be incrementally moved in a forward or reverse direction by a drive mechanism, such as the magnetic jack mechanism described in the cited Frisch patent. Typically a single drive rod is connected to a plurality of control rods known as a "cluster" or "spider. " Accordingly, all the control rods associated with a single cluster move together. In the most common control scheme, several clusters are commanded to move together in what are known as "banks." The drive rods for each cluster extends longitudinally through the pressure vessel along the access of movement of the control rod, into the sealed, pressurized environment of the rod travel housing. Since it is of the utmost importance to maintain the sealed integrity of the pressurized vessel, mechanical penetrations are kept at a minimum to reduce the likelihood of loss of the pressurized environment contained therein. Accordingly, no mechanical penetrations are permitted for detecting the relative position of the control rods within the core of the reactor. Inasmuch as it would be a very difficult task to detect the position of the actual control rods, it has been the practice to detect the position of the drive rods which are affixedly coupled thereto and translate drive rod position into control rod location within the core of the reactive vessel.

A number of different types of detectors have been used in the past to determine drive rod position. One such detector is an analog sensor that includes a plurality of layered, wound coils concentrically arranged in a stack and supported by a nonmagnetic, stainless steel, tubular substructure that is slid over the non-magnetic travel housing. The coils are arranged alternately as primary and secondary coils, with all primary coils connected in series and all secondary coils connected in series. The coils form in effect a long, linear voltage transformer distributed over the height of the travel housing such that the coupling from primary to secondary is affected by the extent to which the magnetic drive rod penetrates the coil stack. Rod position is determined by applying a constant, sinusoidal, excitation current to the primary and measuring the voltage induced across the secondary. The magnitude of the induced secondary voltage corresponds to rod position.

U.S. Pat. Nos. 3,846,771 and 3,893,090 and 3,858,191 each describe a detector employing digital techniques which is more accurate than the foregoing analog detector. The basic sensor of this type of system is formed from a plurality of discrete electrical coils individually wound around the rod travel housing in a tandem array extending longitudinally along the control rod drive shafts axis of movement. An ac current is established within each of the respective coils at a sufficiently low frequency to enable the resulting flux to penetrate the rod travel housing. A change in impedance within the individual coils is monitored as the control rod drive shaft moves past the centers of the coil locations. This change in impedance is translated to discrete electrical outputs indicative of the relative location of the control rod within the core of the nuclear reactor. In one embodiment, the respective coils are connected in series with corresponding resistors and the corresponding common node points of adjacent coil-resistor series combinations are used as inputs to a differential amplifier which provides an output representative of the voltage difference between corresponding nodes. The differential amplifiers output is then translated to a digital indication of the control rod position.

Safety regulations require that the speed at which the control rods can be inserted within the core from a fully withdrawn position under the force of gravity be tested periodically to assure there are no obstructions to rapid insertion of the control rods in the unlikely event that the reactor should have to be shut down in an emergency. Generally, these tests have to be performed after each refueling cycle. There are two generally utilized control rod drop time measurement techniques. The first is to utilize acoustic transducers to listen for the noise that is generated when the control rod reaches the bottom after being released. This method is only applicable to single rod clusters and is not practical for most purposes. The second method is to utilize electrical means to measure the rod drop time. This second method can be applied to several (up to and including all) rods at one time and, thus, can save considerable testing time which has meaningful economic ramifications. While the rod position indication systems, as they are configured to operate during normal reactor operation, are capable of monitoring the position of the control rods as they move at the speed of the magnetic jack system, the position indication systems have too slow a response time to measure the rods position as it falls under the force of gravity. Getting an accurate measure of position versus time is a very important safety consideration because it identifies whether there is any impediment to a rapid shut down of the reactor.

The prior art has measured the rod drop times using the rod position indication systems, with the power supply for energizing the coils disconnected. The current induced in the coils as the drive rod drops through the coils was then monitored as a function of the voltage across a common current path in the system. An example of such a system, as applied to an analog position indication system, is illustrated in U.S. Pat. No. 5,408,508, issued Apr. 18, 1995 and assigned to the assignee of this application. As mentioned in the foregoing patent, the system enables all the control rods to be tested at the same time. However, it has recently been discovered that while an accurate trace of rod position versus time can be obtained when several rods are dropped at one time, distortions are introduced when a significant number of rods, if not all of the rods, are dropped simultaneously. That distortion makes the analysis of the output more difficult. Thus, an improved rod drop measurement system is desired that will provide a more accurate trace of control rod position versus time during a control rod drop test when most, if not all, of the rods are dropped at one time.

SUMMARY OF THE INVENTION

An improved method and system for measuring the free fall time of a plurality of control rod clusters as they are dropped into the core of a nuclear reactor under the force of gravity. The system and method employs the existing control rod position indication system coils which are stacked in tandem along the housing that encloses the drive rod responsible for control rod movement. The system embodying this invention includes a shunt connectable across the primary winding of a common transformer employed to energize each of the coils. During a control rod drop test, when the power is disconnected from the common transformer, the primary is shorted by the shunt to minimize the inductance in the secondary windings which is responsible for the distortions in the output trace experienced by the prior art. In the preferred embodiment, the relay used for disconnecting power from the primary of the transformer includes additional contacts that simultaneously short the primary winding. Thus, an improved rod drop test method and system is provided which enables a true trace of control rod position versus time, even when all of the control rods are dropped simultaneously.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENT

Figures 1, 1A:
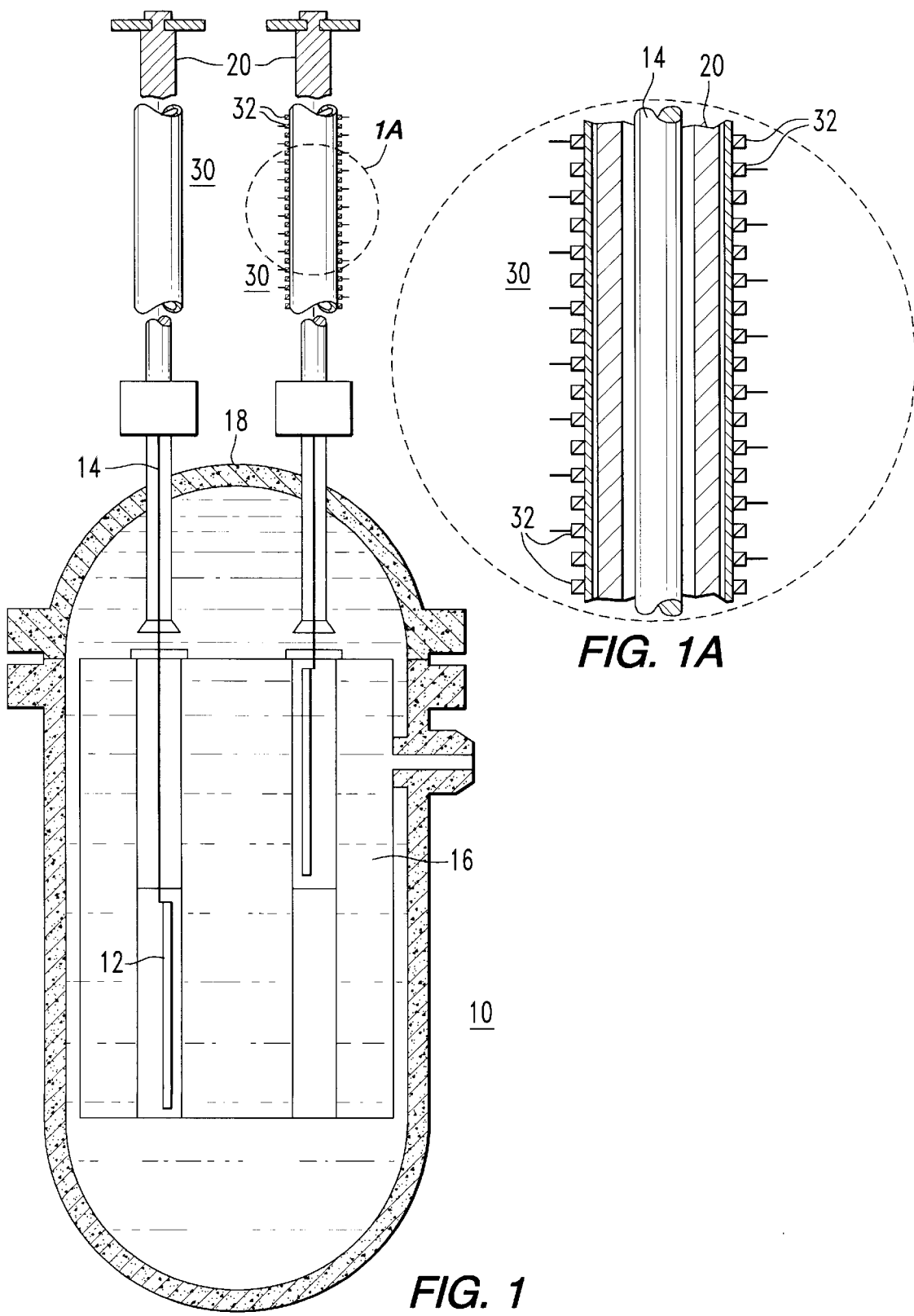
FIG. 1 is an elevational view of a nuclear reactor, its control rod drive, and rod position indication system, which is illustrative of the preferred configuration to which this invention can be applied.
FIG. 1A is an enlarged view of a portion of the rod position indication system of FIG. 1.
Figure 2:
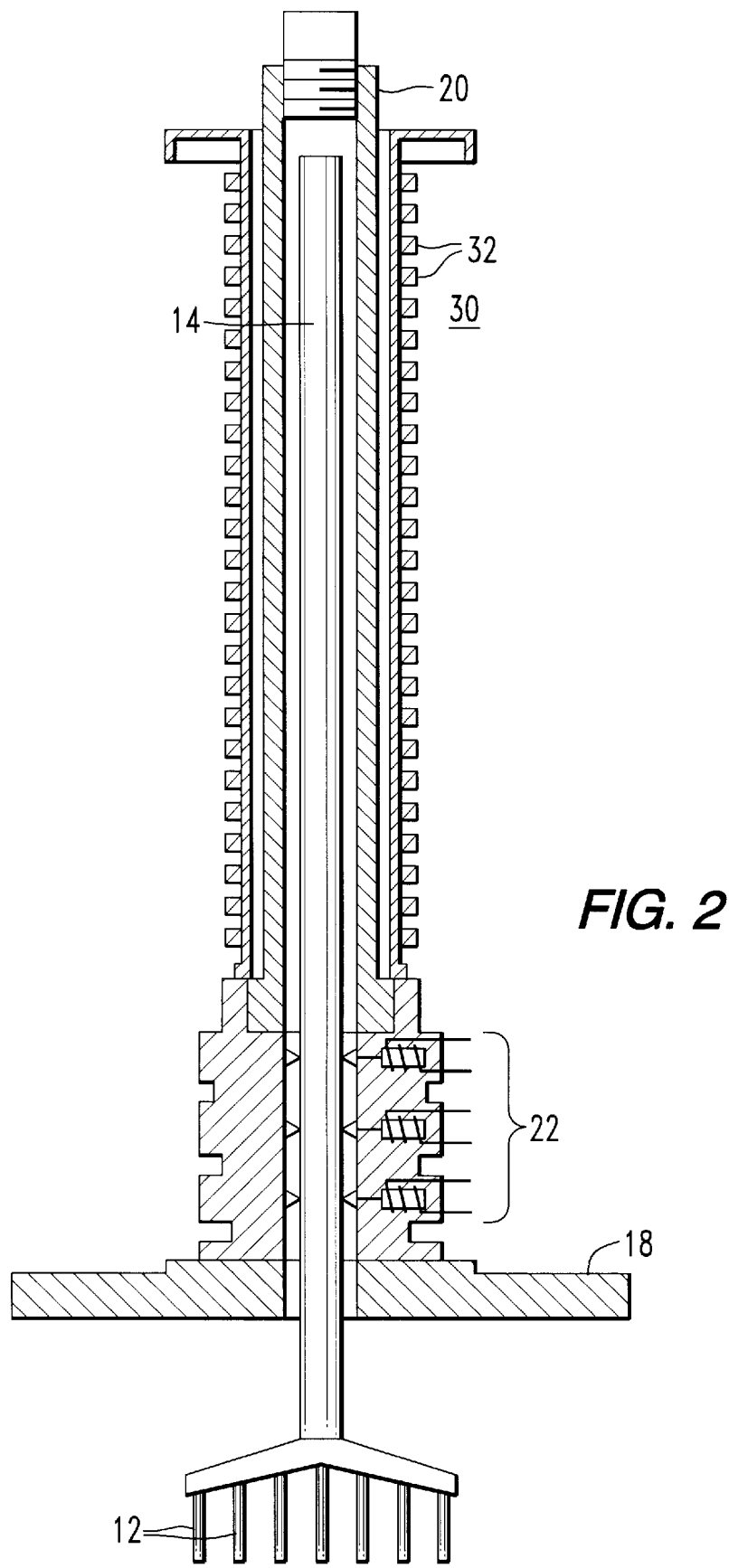
FIG. 2 is an elevational view of a nuclear reactor control rod with its associative drive rod and rod travel housing illustrating the magnetic jack mechanisms used to move the control drive rod, and the rod position sensors utilized by this invention.

Accurate knowledge of the position of the control rods in a nuclear reactor is essential for insuring the reactor's safe and efficient operation. As can be appreciated by referring to FIGS. 1A and 2, the sensing of the position of the control rods within a pressurized water reactor is particularly difficult because of necessity for maintaining the sealed integrity of the reactor pressure vessel 10. The control rods 12 and the drive rods 14, which are structurally coupled to their respective control rods 12, are surrounded with water 16, which completely fills the pressure vessel 10. Under normal operating conditions, the water is at a high temperature and is pressurized so that no boiling takes place.

The position of the control rods 12 must be determined from measurements of the state of sensing elements placed outside the pressure vessel 10, because no mechanical penetrations of the pressure vessel 10 for purposes of control rod position sensing are permitted. The only area where sensing elements can be placed is along the rod travel housing 20. The drive rods 14 move within their respective rod travel housings 20, which are sealed tubular members which are formed integral with, and extend longitudinally upward from, the head 18 of the reactor. Sensing elements 32 placed along the rod travel housing 20 can sense the position of the drive rod 14 only. However, it is normally assumed that the fastening of the control rods 12 to its respective drive rod 14 is reliable and, therefore, the displacement of the drive rod 14 and the control rod 12 are the same. Each drive rod 14 is coupled to a plurality of control rods 12, which form a cluster assembly and can better be appreciated by reference to FIG. 2. Movement of the drive rod 14 is accomplished through the magnetic jack, coils, plungers and grippers 22 that were previously described. The position of the control drive rod 14 within the housing 20 is determined by the control rod position indicator 30 extending longitudinally along the housing above the magnetic jack mechanisms 22. The rod position indicator system 30 in this example is the digital system previous descripted, though it should be appreciated that this invention can also be applied to an analog system as well.

The basic sensor of the rod position indication system is a coil 32 positioned around the perimeter of the axis of movement of the drive rod, external of the rod travel housing. When an ac current is sent through the coils, an ac flux is created which will penetrate into the housing. If the frequency is sufficiently low, the skin depth will be larger than the thickness of the housing, and the ac flux will penetrate all the way through. The normal power frequency of 60 hertz easily meets this criterion. When the metal drive rod is moved through the rod travel housing past a location encompassed by a coil, the impedance of the coil will change. Since the drive rods are constructed of a ferromagnetic material, the impedance of the coil will increase. This increase in impedance is amplified by the magnetic nature of the rod induced by the strong magnetic jack mechanism coils. The change in impedance can be detected in a number of ways.

To sense the change in impedance, each coil 32 is connected to a resistor, and the inputs of a differential amplifier are connected between each pair of adjacent resistors. There will always be one differential output from the amplifiers larger than all the others, indicating between which two coils the end of the rod 14 is positioned. The stack of coils 32 is divided into two interleaved groups A and B, as can be appreciated by reference to FIG. 3. The two groups together form the control rod position indication sensors. The signals obtained from each group of coils are processed separately within the reactor containment. The signals within each group contain the information required to locate the position of the rod within one-half of the overall resolution of the system. Therefore, if one group malfunctions, the systems resolution is degraded but the location of the rod is still known.

Figure 3:
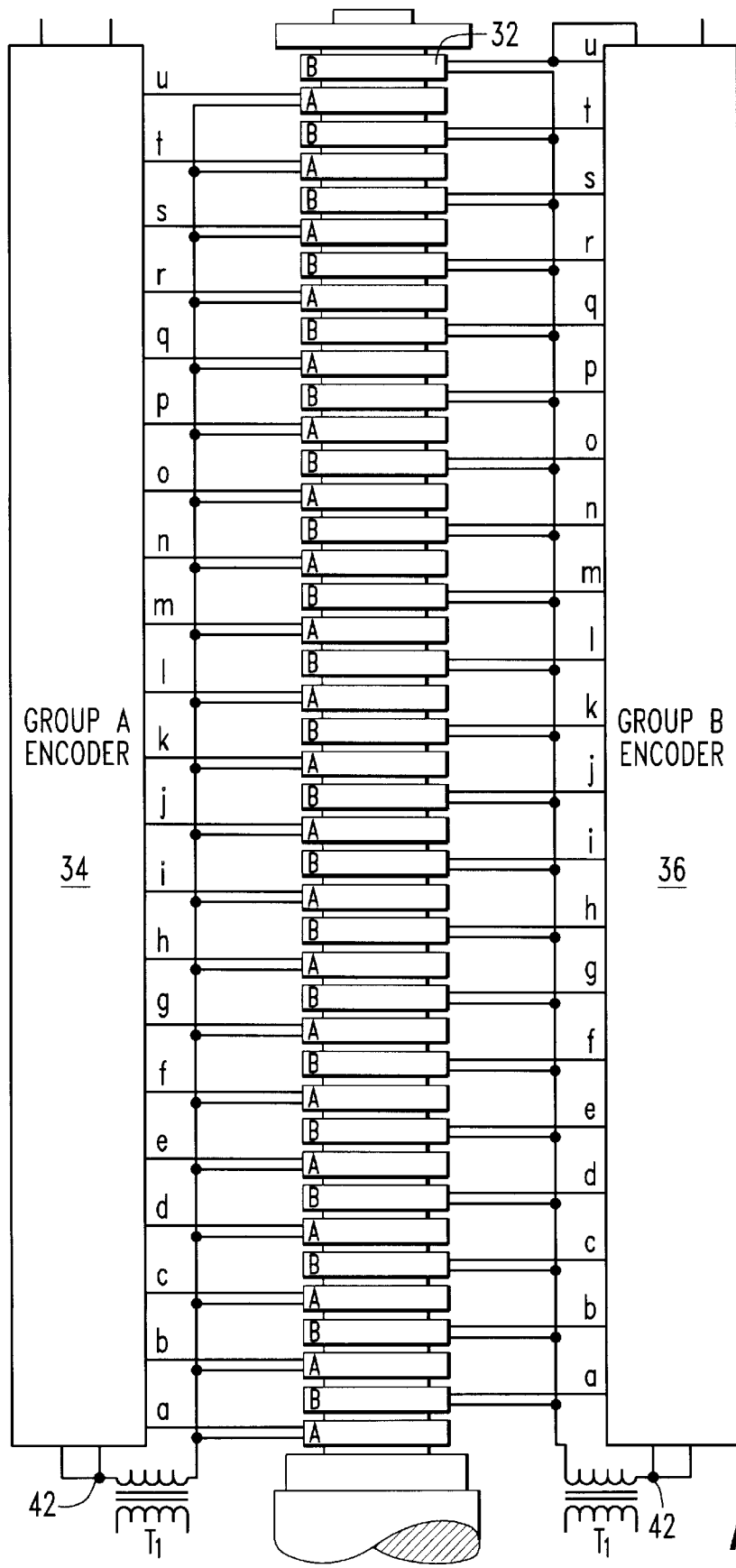
FIG. 3 is a perspective view of a rod position indication system, more clearly showing the coils illustrated in FIGS. 1 and 2.

Each of the approximately 61 drive rods within a 4 loop plant would have a stack of coils, and a group A encoder 34 and a group B encoder 36 within the reactor containment structure, as illustrated in FIG. 3 for encoding the respective coil output signals to a multiplexing arrangement. There are approximately 42 coils provided for each rod.

Figure 4:
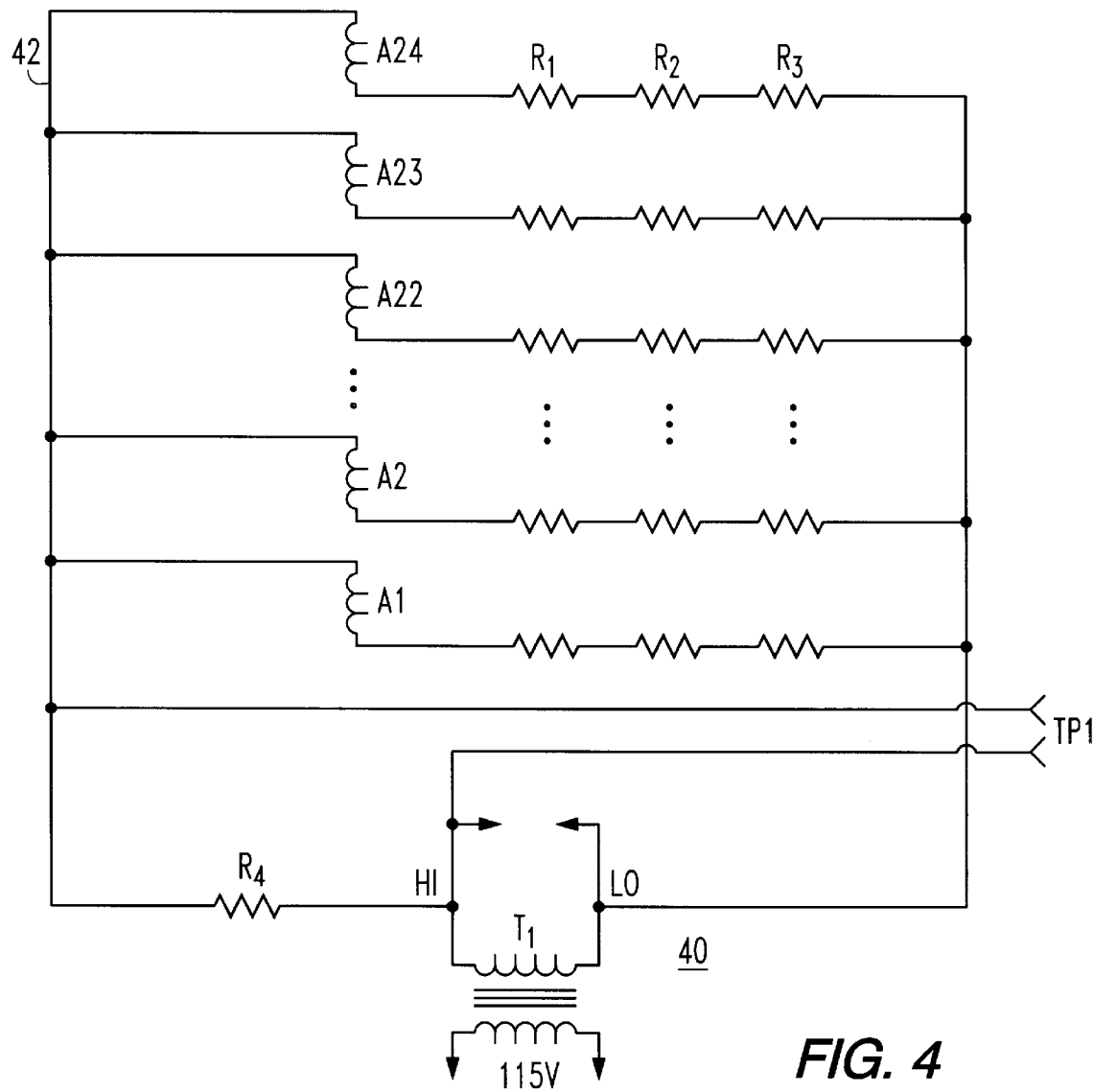
FIG. 4 is a schematic diagram of a typical digital rod position indication circuit for the coils illustrated in FIGS. 1, 2 and 3.
Figure 7:
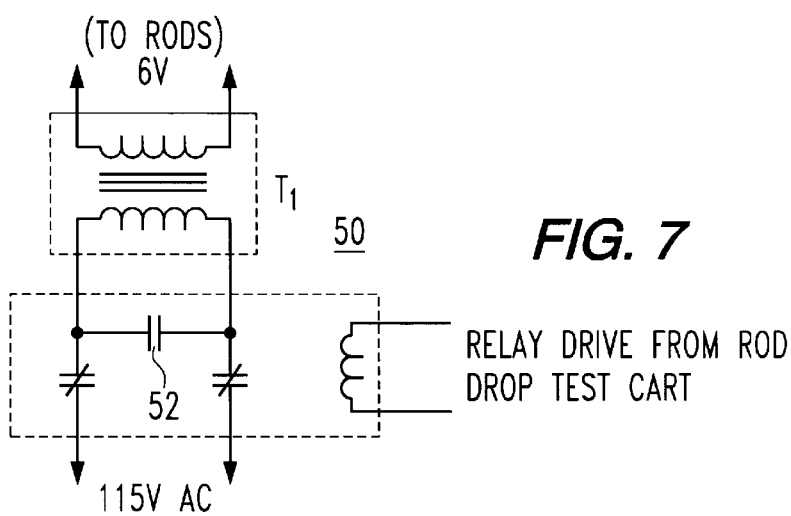
FIG. 7 is a schematic circuit representation of a relay employed in the preferred embodiment to introduce the modifications called for by this invention.

A typical digital rod position indication circuit used to measure rod drop time is shown in FIG. 4. The details of the digital rod indication circuit that are not relevant to the rod drop time measurement have not been shown, but can be found in U.S. Pat. No. 3,858,191. There are a number of coils labeled "$A_1 \ldots A_{24}$" through which the control rod drive shaft extension passes. The exact number of coils depends upon the particular digital rod position indication model and is not important to the invention. One end of each coil is connected to a common wire 42 at the left of FIG. 4. The other end of each coil is connected in common at the right side of FIG. 4 after passing through three resistances $R_1$, $R_2$, and $R_3$. $R_1$ is the coil resistance and is typically in the order of 6 ohms. $R_2$ is the cable resistance from the coil to the digital rod position indication cabinet electronics and is usually in the order of 1.5 ohms. $R_3$ is the input impedance to the digital rod position indicator detector/encoder board and is typically in the order of 5 ohms.

The circuit is completed by $R_4$ and transformer $T_1$. $R_4$ is the cable impedance for the common wire, in the cable that extends from the coils to the digital rod position indication cabinet electronics located within the containment. $R_4$ is typically in the order of 0.118 ohms. $T_1$ is the transformer that energizes the digital rod position coils 32 during normal operation but is not powered during the rod drop time test.

There is a second set of coils, $B_1 \ldots B_{24}$, that are interleaved between the previously described A coils, as mentioned above. The circuit and operation of the B coils is identical to that of the A coils. During normal digital rod position indication system operation, the two sets of coils are redundant and allow independent rod position measurements for increased reliability. For rod drop time measurements, the action of the two sets of coils is combined to give less of a bumpy trace. The bumps can be observed by reference to the traces illustrated in FIGS. 5 and 6, and are due to the drive rod shaft tip passing through the open coils. For purposes of this invention, the two sets of coils perform the same function.

Figure 5:
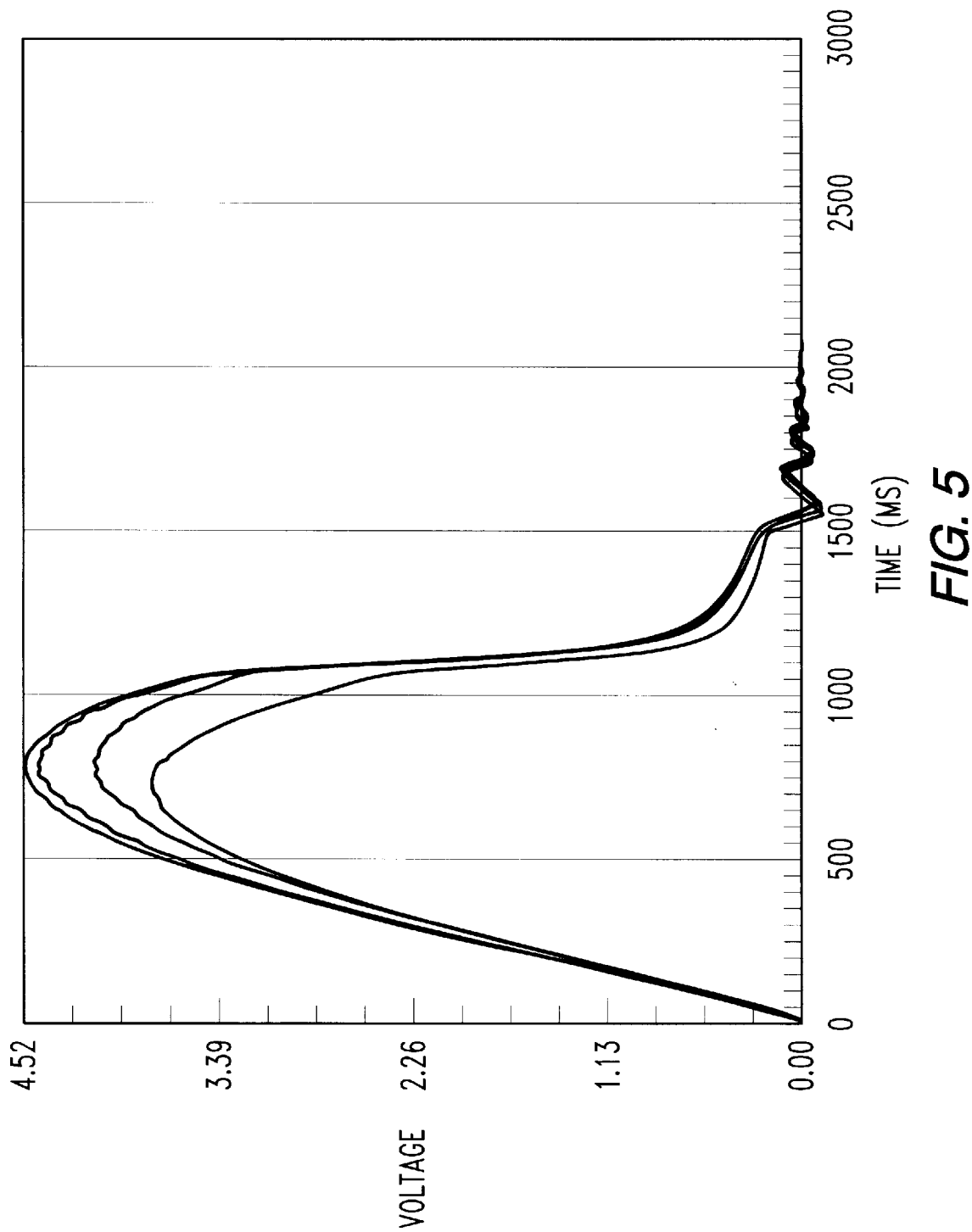
FIG. 5 is a graphical representation of the typical shape of voltage trace obtained from the circuit of FIG. 4 when four control rod clusters are dropped simultaneously.

When the control rod is dropped from fully withdrawn to a fully inserted position, the rod drive shaft tip passes through the coils $A_{24}$ down through $A_2$ in succession (the tip also passes through most of the B coils). The rod drive shaft is somewhat magnetized due to the large coils in the control rod drive jack mechanism situated below the digital rod position indication coils. This permanent magnetism in the rod drive shaft produces a current in the coils $A_{24} \ldots A_1$ as the drive shaft drops through the coils. The magnetic flux from the drive shaft tip cuts the coils and generates the current. The coils are effectively in parallel so the current in the coils is effectively summed. This current is roughly proportional to rod speed. The combined current passes through the transformer $T_1$ secondary winding and $R_4$. The rod drop time measurement system measures the current in the common cable 42 as a function of the voltage drop across $R_4$ at the transformer $T_1$. This voltage is proportional to the current and, thus, is roughly proportional to the rod speed. FIG. 5 shows the typical shape of the voltage trace for four rod clusters that are dropped simultaneously. The rods are released at time zero and accelerate producing an increase in voltage. At slightly beyond 1.000 milliseconds, the rod tips reach the dash pot and the rods rapidly decelerate causing the sharp drop in voltage. The dash pot effect is caused by the rod forcing the coolant from the control rod guide thimbles as it pushes into the reactor core. The corner on the trace just above 1,000 milliseconds is the time at which the rods reach the dash pot which is at a known rod position (near the bottom of the reactor core). At 1,500 milliseconds, the rods reach the stop springs and a slight degree of bounce is observed. FIG. 5 is the normally expected trace where the distortion problem has been eliminated by this invention.

Figure 6:
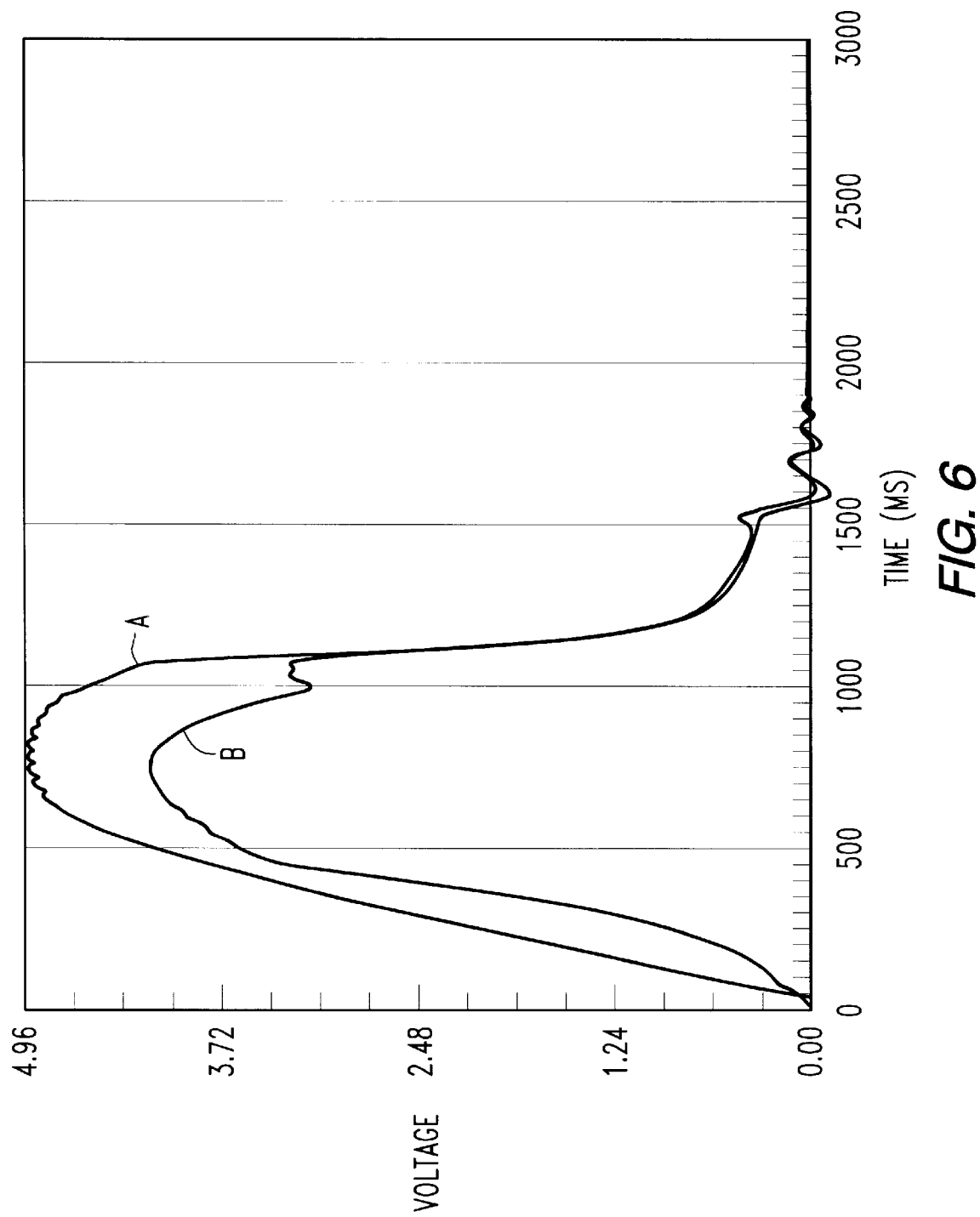
FIG. 6 is a graphical representation of a typical voltage trace obtained from the circuit of FIG. 4 when all of the rods are dropped into the reactor core simultaneously.

FIG. 6 gives two rod drop curves where the distortion experienced by the prior art is present on only the lower curve B. When all control rods are dropped simultaneously to save critical path time, the lower curve in FIG. 6 is obtained. Referring to curve B, a dip can be observed at about 1,000 milliseconds and then another increase until about 1,100 milliseconds where the sudden drop in voltage (rod speed) due to dash pot entry is noted. Also beyond 1,500 milliseconds, there is an upward swiggle before the final drop due to the stop spring action. These distortions make analysis more difficult as the additional features are not due to changes in control rod drop speed. The upper curve A before 1,100 milliseconds and the lower curve B after 1,500 milliseconds are the normal rod drop curves. The cause of the observed distortion when all control rods are dropped simultaneously is the common element, transformer $T_1$. As shown in FIG. 4, all control rod digital rod position indication system A coils are powered by transformer $T_1$. During the rod drop test, $T_1$ is unpowered and its 115 volt primary has previously been left open circuited. The distortion is caused by the voltage drop across the secondary side of $T_1$ from the summed rod drop current from all (typically 50 or more) control rods. Calculations show that the total $T_1$ current is about 30 amperes. The voltage drop across $T_1$ bucks the individual rod drop signals due to the inductance resulting from the open primary circuit, and produces the lower distorted rod drop curve shown in FIG. 6.

The improvement provided by this invention is to eliminate $T_1$ from the rod drop circuit. One approach to accomplish this objective is to short the secondary winding of $T_1$ with a low impedance short, or shunt. This solution has been tested and the technique does solve the problem and eliminates the distortion. This short, however, needs to have a very low impedance (less than 0.001 ohms) to be effective. Remote implementation of this approach using a relay is not practical due to the required low impedance and very low voltage involved (millivolts).

A second method is to short the 115 volt primary of $T_1$ during the rod drop test. It has been determined that essentially all of the distortion is due to the inductance of the transformer $T_1$ and not its dc resistance that otherwise appears across the secondary. Shorting the primary of $T_1$ is much more readily performed due to the much higher impedance. With a turns ratio of approximately 20, the short across the 115 volt primary of $T_1$ needs to be less than 20×20×0.001 ohms, or approximately 0.4 ohms. Currently, a relay is used to disconnect the 115 volt power supply from the primary of the transformer. Additional contacts 52 can be readily added to short the 115 volt primary of $T_1$ when the 115 volt power is disconnected during the rod drop test. When the relay 50 is in the non-energized position, the 115 volt power supply is connected to the primary of $T_1$ and the primary is not shorted. This is the normal digital rod position indication system operating condition. With the relay energized, the 115 volt power supply is disconnected and the primary of $T_1$ is shorted. The relay is energized by the rod drop test system only during the rod drop test. Accordingly, the impedance of the transformer $T_1$ is removed from the system improving the output of the test system.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A system for measuring the free fall time of a plurality of control rod clusters within the core of a nuclear reactor, having a drive rod connected to each control rod cluster which is operative to move the cluster into and out of the reactor core, and a plurality of position sensors associated with each control rod cluster and located in tandem along the path of movement of each drive rod, with each position sensor within the tandem array being energized by a common transformer, including a shunt for shorting the transformer during the period the free fall time is being measured.

2. The measurement system of claim 1 wherein the shunt shorts the primary of the transformer during the measurement period.

3. The measurement system of claim 2 including a relay for both de-energizing the transfer and shorting the primary.

4. The measurement system of claim 1 wherein the sensors are a tandem array of coils.

5. The measurement system of claim 4 wherein the coils are connected in parallel.

6. The measurement system of claim 1 wherein during normal reactor operation the sensors provide discrete digital outputs that identify the position of each control rod cluster, and during the free fall time measurement the sensors provide an analog output.

7. A method for measuring the free fall time of a plurality of control rod clusters within the core of a nuclear reactor, having a drive rod connected to each control rod cluster which is operative to move the cluster into and out of the reactor core, and a plurality of position sensors associated with each control rod cluster and located in tandem along the path of movement of each drive rod, with each position sensor within the tandem array being energized by a common transformer, including the steps of:

disconnecting the transformer primary from the power supply;

shorting the transformer; and providing a measure of the current through the secondary winding of the transformer.

8. The method of claim 7 wherein the shorting step shunts the primary of the transformer.

\* \* \* \* \*